(12) United States Patent
Bariteau

(10) Patent No.: US 8,826,554 B2
(45) Date of Patent: Sep. 9, 2014

(54) CUSTOM BALUSTER LEVEL

(76) Inventor: Ronald Bariteau, North Dartmouth, MA (US)

( * ) Notice: Subject to any disclaimer, the term of this patent is extended or adjusted under 35 U.S.C. 154(b) by 458 days.

(21) Appl. No.: 13/074,059

(22) Filed: Mar. 29, 2011

(65) Prior Publication Data

US 2012/0246911 A1 Oct. 4, 2012

(51) Int. Cl.
*G01C 9/02* (2006.01)
*E04F 11/18* (2006.01)

(52) U.S. Cl.
CPC .............. *G01C 9/02* (2013.01); *E04F 11/1848* (2013.01)
USPC .................................. 33/371; 33/290; 33/375

(58) Field of Classification Search
CPC ..... G01C 9/02; E04F 11/1846; E04F 11/1848
USPC ........... 33/371, 666, 392–394, 227, 374, 375, 33/290, 365; 29/464
See application file for complete search history.

(56) References Cited

U.S. PATENT DOCUMENTS

| | | | | |
|---|---|---|---|---|
| 375,795 | A * | 1/1888 | Beyerle | 33/520 |
| 454,701 | A * | 6/1891 | Barnes | 33/371 |
| 1,583,585 | A * | 5/1926 | Emery | 33/520 |
| 2,096,638 | A * | 10/1937 | Higgins, Jr. | 33/290 |
| 2,316,850 | A * | 4/1943 | Farr | 33/371 |
| 2,395,574 | A * | 2/1946 | Miller | 33/1 HH |
| 2,484,801 | A * | 10/1949 | Anderson | 33/644 |
| 2,596,759 | A * | 5/1952 | Brown | 33/314 |
| 2,632,256 | A * | 3/1953 | Will | 33/342 |
| 2,784,498 | A * | 3/1957 | Fleming | 33/371 |
| 3,118,363 | A * | 1/1964 | Burgess, Jr. | 454/170 |
| 3,190,008 | A * | 6/1965 | Weiss | 33/709 |
| 3,277,579 | A * | 10/1966 | Murphy | 33/372 |
| 3,407,509 | A * | 10/1968 | Martinez | 33/666 |
| 3,442,025 | A * | 5/1969 | Mathiesen | 33/332 |
| 3,448,525 | A | 6/1969 | Majewski | |
| 3,545,091 | A * | 12/1970 | Martin | 33/372 |
| 3,711,955 | A * | 1/1973 | Holt | 33/661 |
| 4,099,331 | A | 7/1978 | Peterson et al. | |
| 4,160,471 | A | 7/1979 | Lapointe | |
| 4,332,046 | A | 6/1982 | Foley et al. | |
| 4,532,718 | A * | 8/1985 | Copeland | 33/390 |
| 5,025,568 | A * | 6/1991 | Grimes | 33/371 |
| 5,067,245 | A * | 11/1991 | Millard | 33/289 |
| 5,414,942 | A | 5/1995 | Moore et al. | |
| 5,522,146 | A * | 6/1996 | Warburton | 33/347 |
| 5,621,977 | A | 4/1997 | Hampton | |
| 5,644,850 | A * | 7/1997 | Costales | 33/282 |
| 5,653,036 | A * | 8/1997 | Dansereau | 33/529 |
| 5,791,061 | A * | 8/1998 | Modugno | 33/392 |
| 6,028,665 | A * | 2/2000 | McQueen | 356/250 |
| 6,082,019 | A | 7/2000 | Lapp, Jr. et al. | |
| 6,098,298 | A * | 8/2000 | Burge | 33/371 |
| 6,367,157 | B1 * | 4/2002 | Diez | 33/203.18 |

(Continued)

*Primary Examiner* — R. A. Smith
*Assistant Examiner* — Tania Courson
(74) *Attorney, Agent, or Firm* — Lambert & Associates; Gary E. Lambert; David J. Connaughton, Jr.

(57) ABSTRACT

A baluster level having a level body defining a view port, a proximal end and a distal end, a plunger slideably secured within the level body, and a leveling device. A method for installing leveled balusters having the steps of compressing a plunger, inserting the level between floor and banister, releasing compression on the plunger, leveling, marking the floor and banister, compressing the plunger and removing the level.

15 Claims, 5 Drawing Sheets

(56) References Cited

U.S. PATENT DOCUMENTS

| | | |
|---|---|---|
| 6,594,910 B2 * | 7/2003 | Wishart .......................... 33/286 |
| D488,729 S | 4/2004 | Golaszewski et al. |
| 7,520,066 B2 * | 4/2009 | Richins .......................... 33/374 |
| 8,201,340 B2 * | 6/2012 | Steffensen ...................... 33/296 |
| 2002/0062570 A1 * | 5/2002 | Palumbo et al. ................. 33/286 |
| 2002/0108261 A1 * | 8/2002 | Miller ............................ 33/283 |
| 2003/0033722 A1 * | 2/2003 | Lanham ......................... 33/374 |
| 2006/0124914 A1 | 6/2006 | Lavargna, Jr. et al. |

\* cited by examiner

CUSTOM BALUSTER LEVEL

FIELD OF THE INVENTION

The present invention relates construction tools. More particularly, the present invention relates to a baluster level.

DESCRIPTION OF RELATED ART

Balusters can be installed between floors or stair treads and banisters in a number of different ways, and usually extend vertically from the floor or stair tread to the banister. It is therefore often desired to make precisely vertical preliminary measurements and markings prior to installing balusters. It is usually the case that the stairway is constructed first, after which a banister is installed. A baluster layout pattern is marked on the stair tread or floor to indicate where the base of each baluster is to be secured. The banister may be preliminarily supported at or near the top and the bottom of the stairway, or in some other preliminary arrangement, prior to the installation of the balusters. It is then necessary to replicate the baluster layout onto the bottom of the handrail, i.e. by making a series of reference markings on the bottom of the handrail which correspond vertically to each baluster layout marking, and then to measure the vertical distances therebetween. The vertical measurement is used to either determine or verify the required baluster lengths. The reference marking indicates the point on the handrail where the top of the baluster should be attached. It is particularly important that the reference markings be placed substantially vertical relative to the stair tread layout for accurate measurements and subsequent placement of the balusters.

A plurality of balusters is generally used to support a handrail. It is therefore desirable to quickly and accurately replicate the baluster layout from the stair tread onto the bottom of the handrail and make the corresponding vertical measurements. The precision with which the markings are replicated affects the accuracy of the corresponding vertical measurements, whether the balusters will be placed substantially vertical, and whether the balusters will be consistently placed with respect to each other. Imprecise markings thus result in future correction and delay, or misaligned balusters. Baluster installation is particularly difficult on inclined banisters.

Therefore, what is needed is an effective and convenient device that may facilitate the leveling of balusters.

SUMMARY OF THE INVENTION

The subject matter of this application may involve, in some cases, interrelated products, alternative solutions to a particular problem, and/or a plurality of different uses of a single system or article.

In one aspect, a baluster level is provided. This level comprises a level body that defines a view port. The level body further comprises a proximal end and a distal end. The proximal end of the baluster level defines an aperture running through at least part of its length. The level further comprises a plunger with a proximal end and a distal end. The plunger proximal end is slideably secured within the central aperture. The level further comprises a leveling device, positioned within the view port of the level body.

In another aspect, a method of installing leveled balusters is provided. This method comprises compressing a plunger of a level against pressure applied by a pressure exerting device, inserting the level between a floor and a banister, releasing the compression of the plunger until a distal end of a level body is in contact with the banister and a distal end of the plunger is in contact with the floor, adjusting the level, marking the floor and banister with a marking device, compressing the plunger and removing the level.

DETAILED DESCRIPTION

Figure 1:
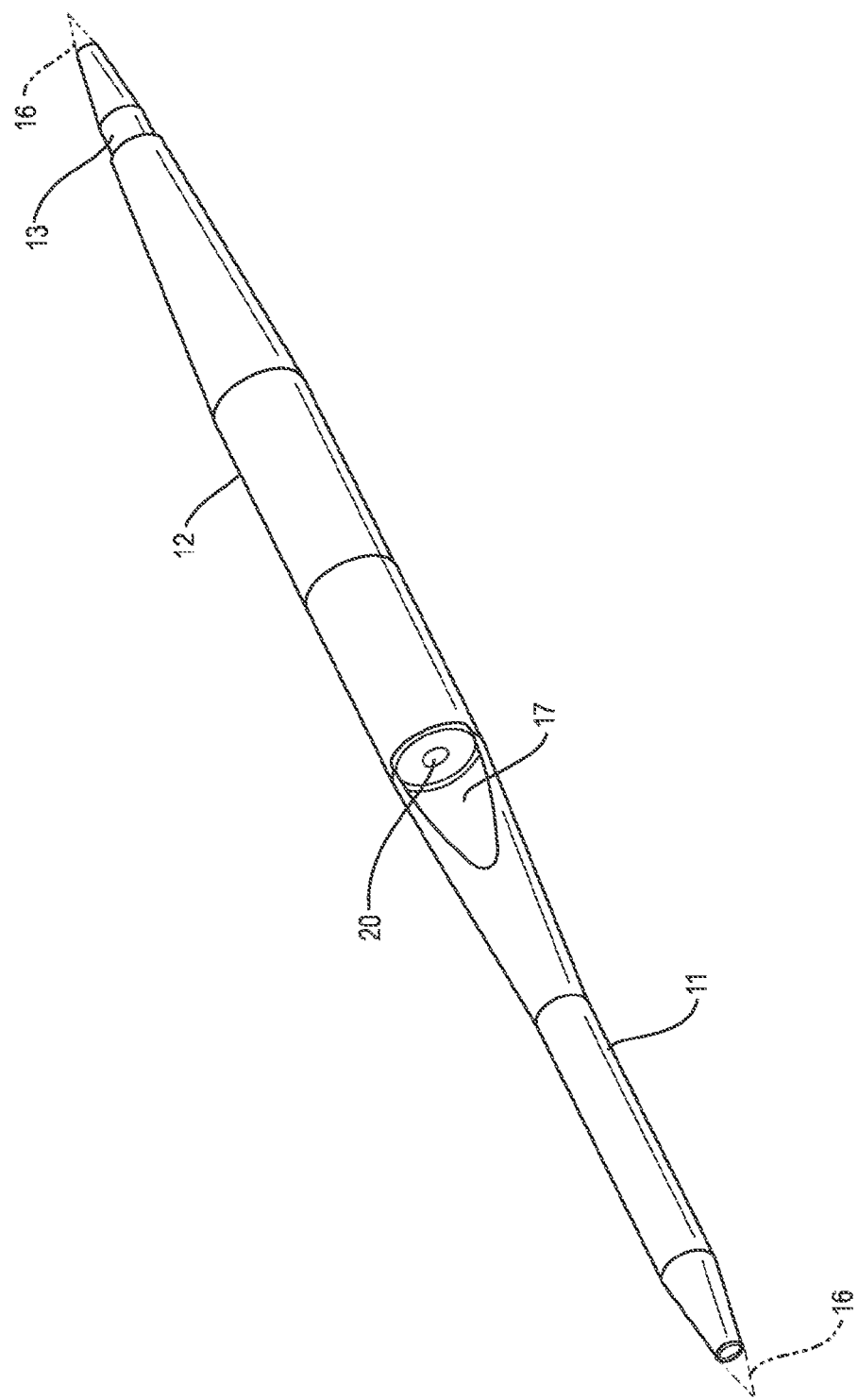
FIG. 1 provides an illustration of a perspective view of one embodiment of the baluster level.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns a baluster level. The baluster level has a level body that forms the structure for the baluster level. The level body may define a view port designed to allow visual inspection of a leveling device. The level has two portions: a level body and a slide housing, these portions may be permanently or removably connected to each other. The level body may include a plunger slideably secured within the level body and extending beyond one end of the level. A pressure exerting device may be positioned between the level and the plunger.

In one embodiment, the level may be constructed in a two piece manner. A level body being limited to a top half of the level, constructed to define a view port and hold a leveling device. A bottom half of the level is formed by the slide housing, which is constructed to receive the plunger. The two pieces are designed to be connected together thus forming the structure for the level body.

In another embodiment, the level may be constructed of a plurality of pieces or sections, including a slide housing and a level body. The plurality of sections may be connected together to form the structure of the level.

The portions of the level may be connected in a variety of manners, for example: at its proximal end, where it is connected to the slide housing, the level body may have a female connection port constructed to allow attachment to a corresponding male connection port of the slide housing. In one embodiment the attachment portion may be a threaded region. In another embodiment, the attachment portion may be a recessed region designed to be pressure fit with the level body. In still another embodiment, the attachment portion may have a ring-protrusion or ring-depression to allow a snap fit with the level body.

The distal end of the level body may taper to a point, in one embodiment. In another embodiment, the distal end of the level body may form shapes such as substantially circular, or substantially rectangular to match the outer perimeter of the baluster intended to be installed. In another embodiment, the distal end of the level body may pivotally attach to a foot, which is constructed to provide a frictional connection point between the plunger and the floor or banister.

In one embodiment, the level body may be constructed to be substantially hollow, defining a central aperture that runs through at least part of its length.

Further, the slide housing, in one embodiment may be constructed to be substantially hollow, defining a central aperture that runs from its distal end along at least part of its length.

The plunger and slide housing of the baluster level may be equipped with a pressure exerting device. The plunger, when slideably secured within the slide housing, may be compressed against this pressure exerting device. The pressure exerting device is designed to allow the baluster level to securely fit between a banister and a floor by exerting pressure on the plunger and slide housing, and in turn exerting pressure on the banister and the floor. By exerting pressure the baluster level may be secured in place. The slideable and compressible nature of this configuration allows the level to fit a wide variety of baluster heights. The pressure exerting device may be any structure capable of exerting pressure against the slide housing and the plunger.

The baluster level may be constructed to be any size and shape that may fit between a floor and a banister. In addition, the baluster level body and slide housing, when assembled, may form a substantially cylindrical baluster level. In one embodiment, the baluster level may be 36.75 inches when in a relaxed state, and 30.4 inches in length when the plunger is fully compressed within the slide housing, and having an outer diameter of 1.75 inches at its widest point. However, the baluster level may vary in size and shape without straying from the scope of this invention.

The baluster level may be constructed of any material capable of defining its structure, and capable of withstanding the force applied by the pressure exerting device with only minimal deformation. Examples of materials of which the baluster level may be made include metals such as aluminum, steel, stainless steel, iron, titanium, or a similar metal alloy, rigid plastics such as PVC and the like, or wood, among others.

In one embodiment a proximal end of the plunger is secured within the slide housing by a flanged head. The flanged head is prevented from exiting a distal end of the slide housing by a reduced aperture diameter in the slide housing such that the aperture diameter is less than the diameter of the flanged head. A distal end of the plunger may be formed to come to a tip. In a further embodiment, the distal end of the plunger may be designed to receive replaceable tips. In yet another embodiment, the distal end of the plunger may form shapes such as substantially circular, or substantially rectangular to match the outer perimeter of the baluster intended to be installed. In still another embodiment, the distal end may pivotally attach to a foot, which is constructed to provide a frictional connection point between the plunger and the floor or banister.

It should be understood that the plunger may be secured within the slide housing by any structure capable of slideable securement. For example, the plunger may be screwed into a device that moves along a track within the slide housing. Alternatively, the plunger may screw, snap, or latch within the slide housing.

In another embodiment, the plunger may be removable from a proximal end of the slide housing, but not removable from a distal end of the slide housing. In a further embodiment, the plunger may be blocked from removal from the proximal end of the slide housing by the position and securement of the pressure exerting device.

One embodiment of the plunger may include markings along its length that identify the length of the span between floor and banister when the baluster level is secured between the floor and banister. In a further embodiment, these markings may be calibrated to incorporate a particular inset into the banister or floor as desired by the user.

In one embodiment, the pressure exerting device may be a spring assembly. This spring assembly may include a spring retainer secured within the slide housing, and a spring secured within the spring retainer.

The spring retainer may be secured, for example, by being screwed into the slide housing by interlocking threads on the spring retainer and the slide housing. In another embodiment, the spring retainer may be snapped into the slide housing. In yet another embodiment, the spring retainer may be pressure fit within the slide housing. It should be understood however, that any securement of the spring retainer to the slide housing will suffice.

In a further embodiment, the spring retainer is shaped as a cylinder which is hollowed to receive a spring, and sized to fit within an aperture defined within the plunger. The spring may then exert force against the spring retainer and the plunger when the spring is compressed.

The spring may be secured within the spring retainer by a variety of structures. In one embodiment, the spring may be constructed with an inner diameter slightly larger than the spring retainer, and the spring retainer may have a flanged head with a diameter larger than the inner diameter of the spring. In this embodiment, the spring may slide over the spring retainer, and be stopped at one end by the flanged head of the spring retainer. In another embodiment, the spring retainer may have a hollowed central region with a diameter larger than the outer diameter of the spring. In this embodiment part of the length of the spring may fit within the hollowed central region.

In another embodiment, the pressure exerting device may be a gas piston, which may use the compression of gas to apply pressure against the plunger and the slide housing.

As noted, the level body may define a view port to allow visual inspection of a leveling device. The leveling device may be any device or combination of devices that provides an indication of the leveling of the baluster level.

In one embodiment, the leveling device may be a bull's eye level, which has a center circular marking and a bubble in a fluid which is aligned with the circular marking when leveled.

In another embodiment, the leveling device may comprise a left-right spirit level, and a forward-backward spirit level.

In yet another embodiment, the leveling device may be a laser level device.

In still another embodiment, a pendulum or plumb-bob device may be used to indicate leveling.

As previously described, in one embodiment, the distal end of the level body and the distal end of the plunger may both be constructed to form tips. Therefore, when the baluster level is assembled, its outward facing ends may both end in a tip. The tip may be designed to facilitate securing of the baluster level when leveling is being determined. Sharp tips may be particularly valuable when leveling balusters between angled banisters and a floor, or angled banisters and angled lower levels, because the tip can catch the surfaces without slipping. Further the tip may serve to indent the leveling surface providing a mark guide baluster installation.

In one embodiment, the tip may be formed to be integral with the plunger or level body. In another embodiment, the tip may be removably attached to the distal ends of the plunger or level body, allowing removal and replacement of the tip. For example, plumb bob replacement tips could be utilized, such as a standard sized 10-32 plumb bob replacement tip. In yet another embodiment the tip may be a marking device such as a marker, pen, pencil, or chalk, and may be removable or integral with the plunger or level body. The tips may be removable by any removable connection structure such as a screw connection, pressure connection, snap connection, or latch connection, among others.

Turning now to FIG. 1, a perspective view of one embodiment of the baluster level is shown. A level body 11 is connected to a slide housing 12. The level body 11 has a tip 16 removably connected at its distal end. A plunger 13 is shown extending from the slide housing 12, and slideably mounted therein. The plunger 13 can be seen to be in a fully compressed position, with a majority of its length located within the slide housing 12. The plunger 13 has a tip 16 at its distal end. The level body 11 further defines a view port 17 through which visual inspection of the leveling device 20 may be achieved. FIG. 1 shows the leveling device 20 as a bull's eye level.

Figure 2:
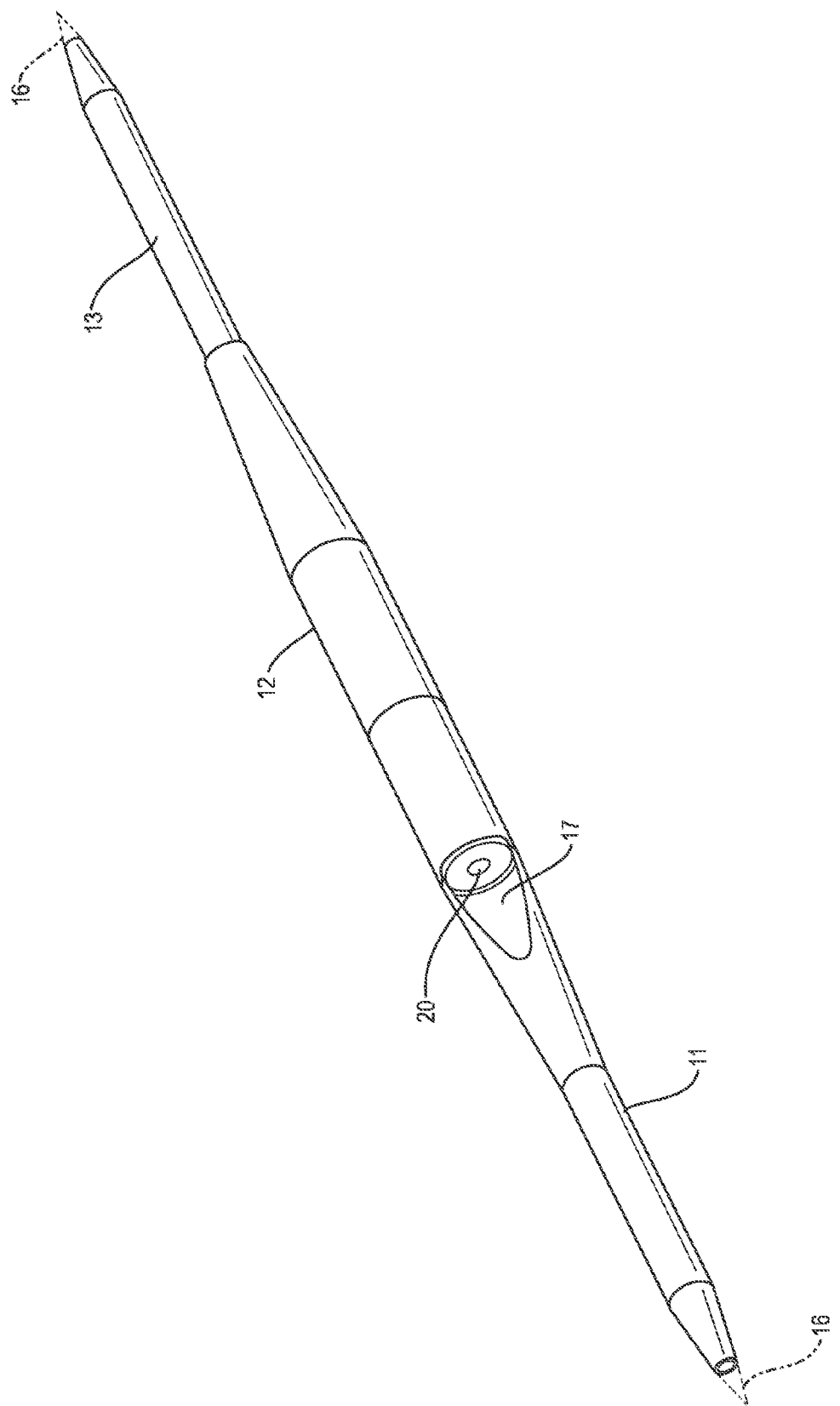
FIG. 2 provides an illustration of a perspective view of one embodiment of the baluster level with the plunger in a fully extended position.

FIG. 2 shows a perspective view of one embodiment of the baluster level with the plunger in a fully extended position. The level body 11 is connected to the slide housing 12 similarly to as shown in FIG. 1. The level body 11 defines a view port 17 and has a tip 16 at its distal end. Further, the plunger 13 is fully extended from the slide housing 12. Plunger 13 has a tip 16 at its distal end. The leveling device 20 is shown as a bull's eye level.

Figure 3:
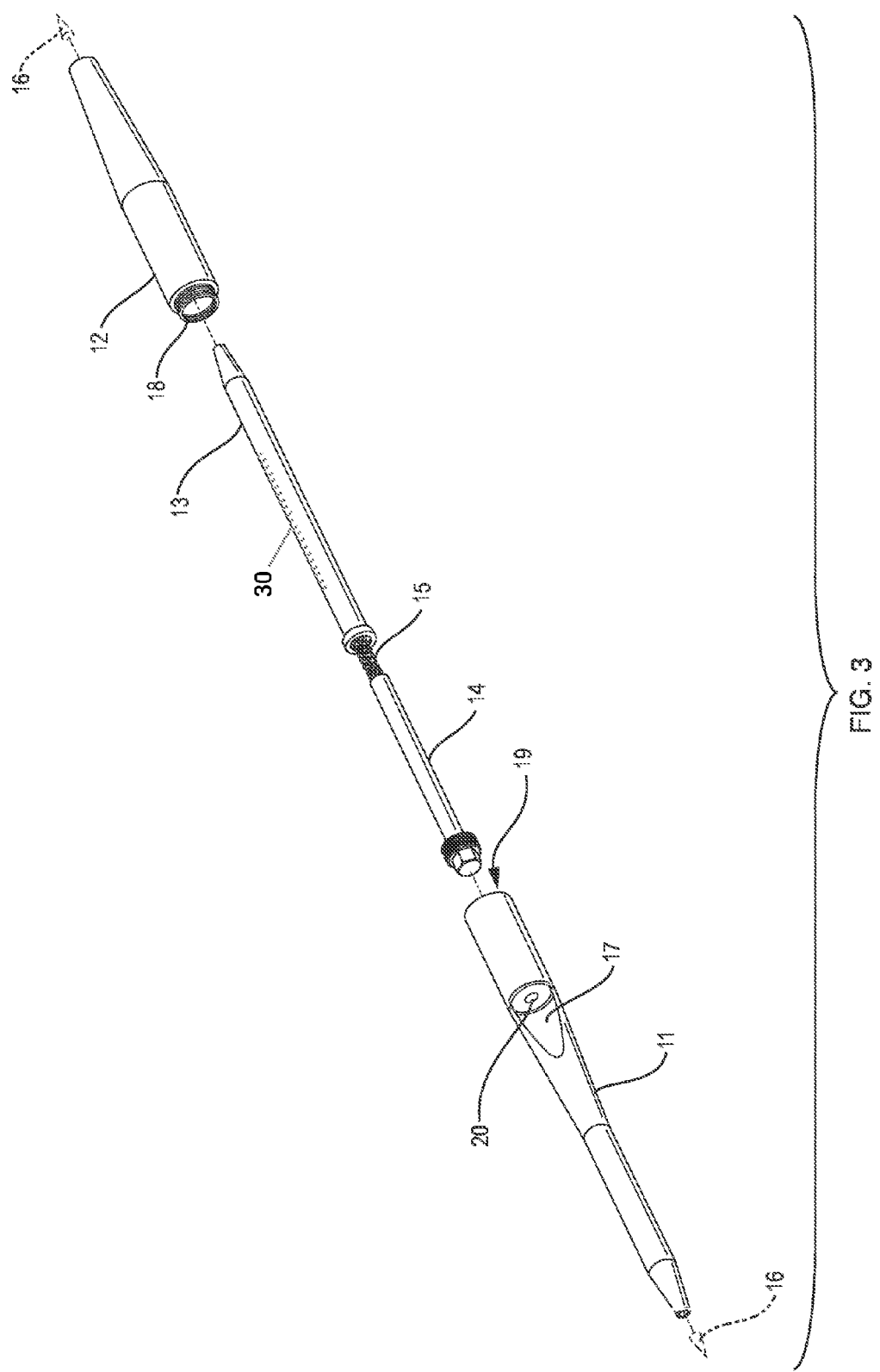
FIG. 3 provides an exploded view of an embodiment of the baluster level.

FIG. 3 shows an exploded view of an embodiment of the baluster level. The level body 11 defines a view port 17 with a leveling device 20 positioned therein. The level body 11 has a tip 16 removably connected at its distal end. The level body 11 further defines a female connection port 19 constructed to receive a male connection port 18 of the slide housing 12 by threaded connection, which allows the level body 11 and slide housing 12 to be removably connected. A spring retainer 14 retains a spring 15 which acts as a pressure exerting device. The spring 15 fits between the spring retainer 14 and the plunger 13 and exerts pressure between the two when compressed. The spring retainer 14 has a threaded region that may fit within the slide housing 12 and be retained therein, as discussed with respect to FIGS. 4 and 5. Further, the spring retainer 14 is sized such that its outer diameter is slightly smaller than an inner diameter of an aperture of the plunger 13. Therefore, the spring retainer 14 may fit within the plunger 13 when assembled. Finally a tip 16 can be removably connected to the distal end of the plunger 13. A plurality of markings 30 can be seen along an outer surface of the plunger indicating length of the assembled level at varying compressions.

Figure 4:
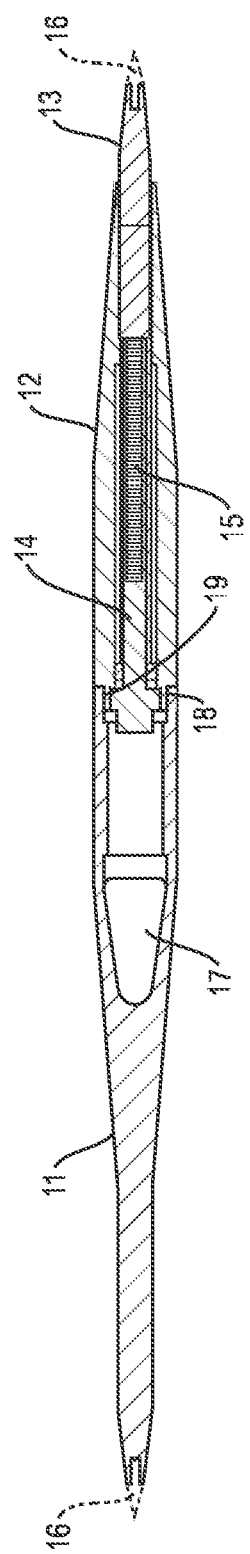
FIG. 4 provides a cross sectional view of one embodiment of the level in a compressed position.

FIG. 4 shows a cross sectional view of one embodiment of the level in a compressed position. The level body 11 is connected to the slide housing 12 by the female connection port 19 of the level body 11 and male connection port 18 of the slide housing 12. The level body 11 has a tip 16 removably connected at its distal end, and defines a view port 17. The spring retainer 14 is retained within the slide housing 12, and slideably fitted within an aperture of the plunger 13 which is in a compressed position. The spring 15 is positioned partially within the plunger 13 and partially within the spring retainer 14. A tip 16 is removably connected to the distal end of the plunger 13.

Figure 5:
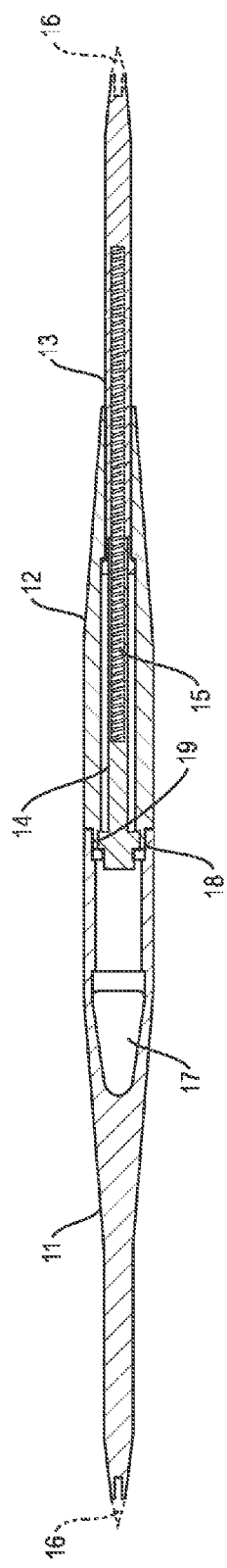
FIG. 5 provides a cross sectional view of one embodiment of the level in an uncompressed position.

FIG. 5 shows a cross sectional view of one embodiment of the level in an uncompressed position. The level body 11 is connected to the slide housing 12 by the female connection port 19 of the level body 11 and male connection port 18 of the slide housing 12. The level body 11 has a tip 16 removably connected at its distal end, and defines a view port 17. The spring retainer 14 is retained within the slide housing 12, and slideably fitted within an aperture of the plunger 13 which is in an uncompressed position. The spring 15 is positioned partially within the plunger 13 and partially within the spring retainer 14. A tip 16 is removably connected to the distal end of the plunger 13.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A baluster level system comprising:
    a level comprising:
        a level body, having a proximal end, a distal end, and defining a view port;
        a slide housing connected to the proximal end of the body at a proximal end, and defining a central aperture formed through at least part of a length of the slide housing;
        a plunger, having a proximal end and a distal end, the plunger proximal end being slideably secured within the central aperture of the slide housing;
        a leveling device positioned within the view port of the level body;
        a pressure exerting device disposed between the slide housing and the plunger, constructed and arranged to exert pressure upon the plunger and the slide housing along a lengthwise axis of the level, urging the distal end of the plunger away from the distal end of the level body, wherein the pressure exerting device is a spring assembly; and
        wherein the level is positioned between a banister and a floor, the spring assembly causing the distal end of the plunger to exert a continual force on one of the floor or banister, and causing the distal end of the level body to exert a continual force on the other of the floor or banister, thereby holding the level in place between the banister and the floor.

2. The baluster level system of claim 1 wherein the level body and slide housing are removably connected.

3. The baluster level system of claim 2 wherein the level body and the slide housing are connected together by threaded connections.

4. The baluster level system of claim 1 wherein the distal end of the plunger forms a tip.

5. The baluster level system of claim 4 wherein the tip of the distal end of the plunger is removable.

6. The baluster level system of claim 1 wherein the proximal end of the plunger forms a flanged head, and wherein at least part of the central aperture has a diameter less than a diameter of the flanged head.

7. The baluster level system of claim 1 wherein the distal end of the level body forms a tip.

8. The baluster level system of claim 7 wherein the tip of the distal end of the level body is removable.

9. The baluster level system of claim 1 wherein the level body and plunger are substantially cylindrical.

10. The baluster level system of claim 1 wherein the leveling device is a bull's-eye level.

11. The baluster level system of claim 1 wherein the distal end of the level body further comprises a marking device.

12. The baluster level system of claim 1 wherein the distal end of the plunger further comprises a marking device.

13. The baluster level system of claim 1 wherein the plunger further comprises a plurality of markings along an outer surface indicating length.

14. A baluster level system comprising:
   a level comprising:
   a level body having a proximal end and a distal end, the level body defining a view port, the proximal end having an attachment portion, the distal end of the level body formed to receive a tip;
   a slide housing having a proximal end and a distal end, the slide housing constructed and arranged to attach to the attachment portion of the level body at its proximal end by a threaded connection, the slide housing defining a central aperture at its distal end running through at least part of its length;
   a plunger having a proximal and distal end, the plunger being slideably secured within the central aperture of the slide housing, the plunger forming a flanged head at its proximal with a diameter large enough to prevent removal from at least a part of the central aperture;
   a pressure exerting device, positioned between the plunger and the slide housing, constructed and arranged to exert pressure upon the plunger and the slide housing along a lengthwise axis of the level, urging the distal end of the plunger away from the distal end of the level body, wherein the pressure exerting device is a spring assembly; and
   a leveling device positioned within the view port of the level body; and
   wherein the level is positioned between a banister and a floor, the spring assembly causing the distal end of the plunger to exert a continual force on one of the floor or banister, and causing the distal end of the level body to exert a continual force on the other of the floor or banister, thereby holding the level in place between the banister and the floor.

15. The baluster level system of claim 14 wherein the spring assembly comprises:
   a spring retainer, secured within the slide housing central aperture; and
   a spring, retained by the spring retainer.

\* \* \* \* \*